United States Patent
Dentlinger

(10) Patent No.: US 7,255,268 B2
(45) Date of Patent: *Aug. 14, 2007

(54) SYSTEM FOR PURCHASE OF PREPAID TELEPHONE SERVICES

(75) Inventor: Dale H. Dentlinger, Naperville, IL (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,449

(22) Filed: Feb. 6, 2006

(65) Prior Publication Data

US 2006/0124732 A1    Jun. 15, 2006

Related U.S. Application Data

(63) Continuation of application No. 08/487,813, filed on Jun. 7, 1995, now abandoned.

(51) Int. Cl.
G06F 7/08      (2006.01)

(52) U.S. Cl. .............. 235/380; 379/114.18; 379/114.2; 705/24

(58) Field of Classification Search ........ 235/375–382; 379/114.15–114.2, 144.01–144.08; 705/24, 705/500

See application file for complete search history.

(56) References Cited

U.S. PATENT DOCUMENTS

| | | | |
|---|---|---|---|
| 4,711,994 A * | 12/1987 | Greenberg ................... | 235/384 |
| 4,896,791 A | 1/1990 | Smith ........................ | 235/381 |
| 4,970,655 A | 11/1990 | Winn et al. .................. | 235/381 |
| 5,010,485 A | 4/1991 | Bigari ........................ | 235/379 |
| 5,025,139 A | 6/1991 | Halliburton, Jr. ........... | 235/379 |
| 5,101,098 A | 3/1992 | Naito ......................... | 235/475 |
| 5,243,174 A | 9/1993 | Veeneman et al. .......... | 235/381 |
| 5,352,876 A | 10/1994 | Watanabe et al. ........... | 235/381 |
| 5,359,182 A * | 10/1994 | Schilling .................... | 235/380 |
| 5,440,108 A | 8/1995 | Tran et al. .................. | 235/381 |
| 5,442,567 A | 8/1995 | Small ......................... | 364/479 |

(Continued)

FOREIGN PATENT DOCUMENTS

CA      2 222 749      12/1996

(Continued)

*Primary Examiner*—Michael G. Lee
*Assistant Examiner*—Jamara A. Franklin
(74) *Attorney, Agent, or Firm*—Baker Botts L.L.P.

(57) ABSTRACT

A system and method for electronic purchase of prepaid telephone services is provided. An initiating terminal receives input of a customer's request to purchase a specified amount of prepaid telephone services and receives input of the customer's designation of a financial account from which to electronically debit the price of such purchase. A central terminal receives these inputs from the initiating terminal, obtains authorization for the request, and transmits data to the initiating terminal for the initiating terminal to, in turn, print on a receipt and provide to the customer. This receipt is then used instead of a telephone card to obtain telephone services up to the specified amount. Such receipt may also detail instructions and an authorization number, such as a personal identification number or PIN, to initiate the pre-paid telephone service. The system and method of the present invention also preferably transfers the funds from the appropriate demand or credit account to pay for the purchased telephone services. An additional, separate Regulation E-type receipt is preferably also printed reflecting the financial transaction.

28 Claims, 2 Drawing Sheets

U.S. PATENT DOCUMENTS 5,477,038 A    12/1995    Levine et al. ............... 235/380
5,563,934 A    10/1996    Eda ........................... 235/380
5,577,109 A    11/1996    Stimson et al. ............ 235/381

FOREIGN PATENT DOCUMENTS

| | | |
|---|---|---|
| EP | 0 836 727 B1 | 6/1996 |
| JP | 3-226896 | 10/1991 |
| JP | 5-182068 | 7/1993 |
| JP | 2002189961 | 7/2002 |
| WO | WO95/34161 | 12/1995 |
| WO | WO96/38801 | 12/1996 |

* cited by examiner

SYSTEM FOR PURCHASE OF PREPAID TELEPHONE SERVICES

CROSS REFERENCE TO RELATED APPLICATIONS

This application is a continuation of U.S. application Ser. No. 08/487,813 filed Jun. 7, 1995 now abandoned by Dale Dentlinger and entitled "System and Method for Dispensing of a Receipt Reflecting Prepaid Phone Services" which is incorporated herein by reference.

BACKGROUND OF THE INVENTION

1. Technical Field of the Invention

The present invention relates generally to prepaid phone services, and more particularly to a system and method for electronic dispensing of a receipt reflecting prepaid telephone services to be used by customers in place of current prepaid telephone cards, including electronic debiting of an account for costs associated therewith.

2. Description of the Related Art

Telephone companies currently sell a physical card product that allows consumers to purchase pre-paid phone services, such as long distance time, in predetermined increments of time, on the respective company's network(s). Consumers purchase these cards for the convenience of a calling card with the security of a pre-set spending limit. These cards may be the typical plastic cards normally associated with the debit and credit industry or are wallet-sized cardboard cards imprinted with PIN (personal identification number) information and dialing instructions. These cards are designed to be discarded once the time purchased is consumed. The value of the card is maintained on the respective telephone company's network system. For purposes of convenience, "Company" will refer hereinafter to the specific telephone system carrier on whose network time is to be pre-purchased.

Such prepaid telephone cards are sold at retail outlets, either over-the-counter or through vending machines. An ordinary retail receipt is issued for the cards purchased when the cards are purchased over-the-counter. Such receipts give the customer no additional information other than that phone cards were purchased, the cost of the card(s) purchased, the date, and, normally, the retailer where the cards were purchased.

There are a number of drawbacks to the process described above. A customer must find a retail outlet which is open and is not out of calling cards. If a large purchase of telephone network time is desired, many retail outlets in the evening and night do not accept large denomination currency to pay for purchases. Additionally, the retail outlet must maintain and track a secured inventory of cards by number and denomination, and report the sales and number of cards sold to the Company. Such a system is very labor-intensive and costly to operate. Moreover, there is considerable expense on behalf of the Company to produce and distribute the cards to the retailers.

SUMMARY OF THE INVENTION

In view of the above problems associated with the related art, it is an object of the present invention to provide a system and method for dispensing a printed receipt which reflects prepaid phone services to be used by a customer instead of a telephone card.

It is another object of the present invention to provide a system and method for electronically dispensing such receipt via an automatic teller machine ("ATM") or personal computer fitted with a printer.

It is a further object of the present invention to provide a system and method for electronically debiting a designated account for the costs of the prepaid phone services reflected on such printed receipt.

The present invention achieves these and other objects by providing a system and method for electronically dispensing a receipt reflecting prepaid phone services from an initiating terminal, such as an Automated Teller Machine (ATM) or personal computer, including electronic debiting of an account for costs associated therewith.

In one aspect of the present, a system and method for purchase of prepaid telephone services is provided. An initiating terminal receives input of a customer's request to purchase a specified amount of prepaid telephone services and receives input of the customer's designation of a financial account from which to electronically debit the price of such purchase. A central terminal receives these inputs from the initiating terminal, obtains authorization for the request, and transmits data to the initiating terminal for the initiating terminal to, in turn, print on a receipt and provide to the customer. This receipt is then used instead of a telephone card to obtain telephone services up to the specified amount. Such receipt may also detail instructions and an authorization number, such as a personal identification number or PIN, to initiate the pre-paid telephone service. The system and method of the present invention also preferably transfers the funds from the appropriate demand or credit account to pay for the purchased telephone services. An additional, separate Regulation E-type receipt is preferably also printed reflecting the financial transaction.

One advantage of the system and method of the present invention is that it allows a wider range of payment mechanisms for financing the transaction (e.g., credit, debit or smart cards). Many retail outlets at which traditional cards are sold do not take credit cards or debit cards. This limits the customer to paying with cash or check. Another advantage, when the initiating terminal is an ATM, is the convenience of purchasing prepaid telephone cards while a customer does their banking.

These and other features and advantages of the invention will be apparent to those skilled in the art from the following detailed description of preferred embodiments, taken together with the accompanying drawings, in which:

DETAILED DESCRIPTION OF THE PREFERRED EMBODIMENTS

The present invention electronically dispenses a receipt for prepaid telephone services to be used by customers in place of current prepaid telephone cards. As a brief overview, a customer desiring to purchase prepaid telephone services preferably uses an ATM to access the system services of the present invention. It should be understood that the customer could instead have used a personal computer outfitted with the capability to access the system service of the present invention and a printer. With either option (ATM or personal computer), the customer preferably interacts with the system of the present invention via a graphic user interface (GUI).

Figure 2:
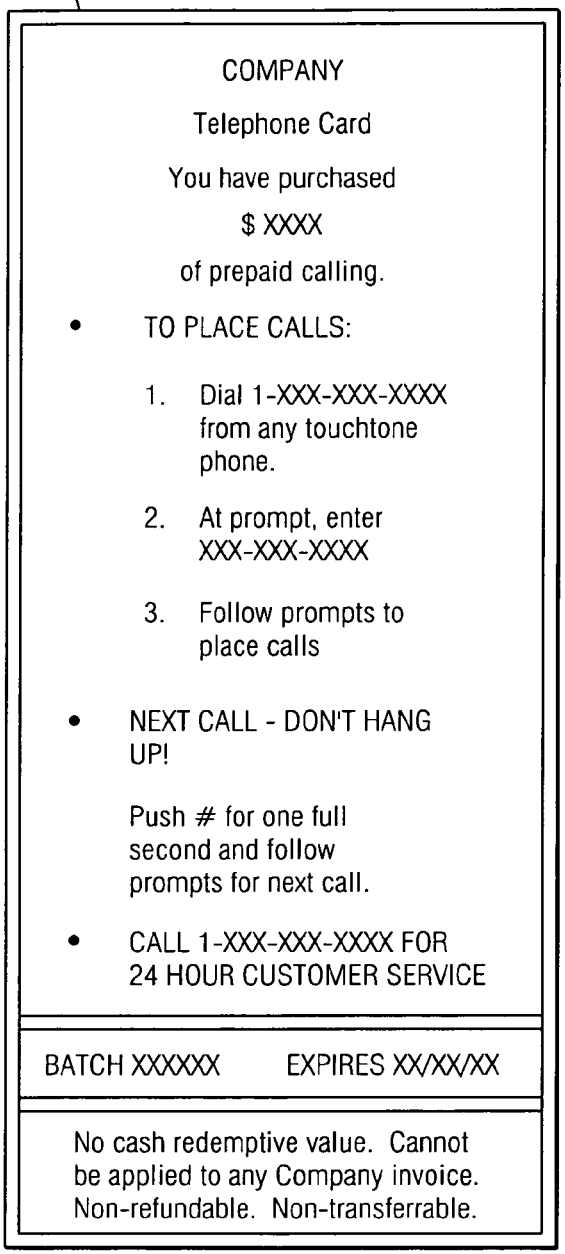
FIG. 2 is an illustrative example of a receipt printed by the system of the present invention.

Regardless of the input terminal selected (personal computer, ATM, etc.), the customer preferably uses a card to make funds available from a financial account corresponding to the card. Such card could be a credit card, debit card, smart card or stored value card. At this point, the funds to be transferred are held or pre-authorized as available and the customer's account is debited. A customer's account may also be debited the amount of a customary transaction or convenience fee. A convenience fee may be charged for each prepaid telephone service transaction. At least one receipt is printed for the customer showing an "800 number", a PIN, and how much time has been purchased. An example of how such a receipt 200 might appear is illustrated in FIG. 2 and discussed in more detail below. The customer calls the "800" number, enters the PIN number, and preferably hears a recording telling the customer that he has a predetermined amount of time to talk, depending on how much time he purchased. By following the Company's recorded prompts, the customer then dials the destination telephone number he wanted to call and begins talking. As there are many ways to carry out customer interaction with a Company, and such is beyond the scope of the present invention, it will not be described in further detail.

The present invention can probably best be understood by considering it as two distinct transactions, which will hereinafter be referred to as "requesting" and "dispensing", together comprising the overall transaction. Those of ordinary skill in the art will understand considering the initiating terminal as an "issuer" and the central terminal as an "acquirer" for purposes of the requesting transaction, as well as considering the central terminal as an "issuer" and the initiating terminal as an "acquirer" for purposes of the dispensing transaction. The requesting transaction is preferably portrayed as a withdrawal, or a withdrawal with a convenience charge, as may be the case.

Figure 1:
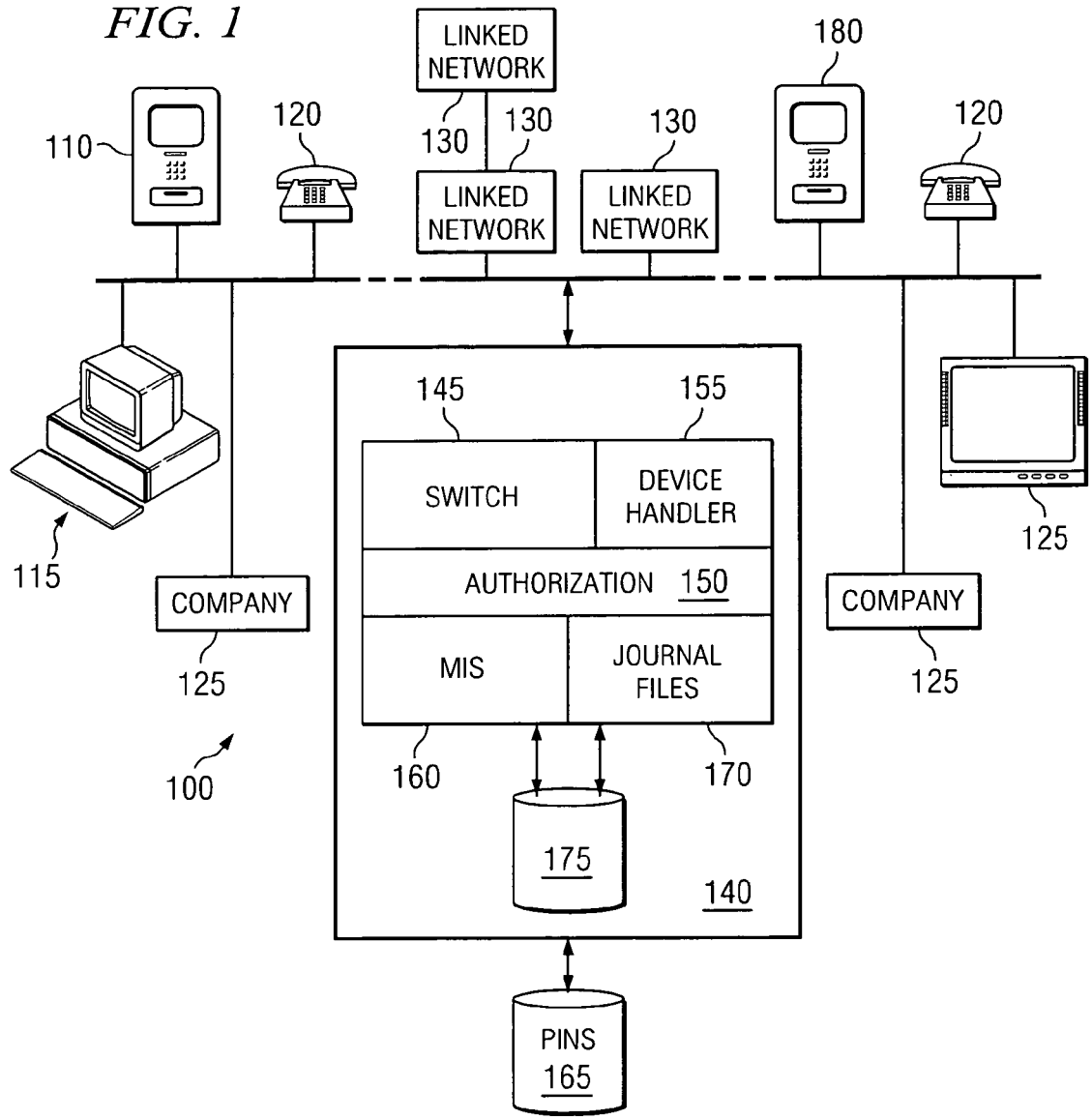
FIG. 1 is a schematic overview diagram illustrating an example network containing an embodiment of the present invention.

The requesting transaction may be logically considered to include a request to purchase prepaid telephone services, a request for authorization, and an approval (if any). Consider FIG. 1, which is a schematic diagram of an example network illustrating an embodiment of the present invention. The requesting portion of the overall transaction begins with a request to electronically purchase prepaid telephone services from an initiating terminal. This "terminal" is the medium a customer uses to create the request to electronically purchase the prepaid telephone services, e.g., ATM 110, personal computer 115 with a Graphical User Interface (GUI), etc. The GUI preferably supports at least Windows, DOS or Macintosh environments. For the sake of the following discussion, and unless otherwise stated, initiating terminal 110 will be an ATM. It should be understood that any of the initiating terminals ATM 110, personal computer 115, screen telephone with printing mechanism 120, or television with printing mechanism 125 could have been used instead. Moreover, initiating terminal 110 may be physically situated anywhere including a convenience store, a grocery store, a post office, a branch of a financial institution, a mall, or other location.

Initiating terminal 110 preferably permits the transmission of debit or credit card information with the associated PIN encrypted and encoded to ensure security as to the debit or credit card information. Such terminal, if not an ATM which is customarily deS-secure, preferably includes a device (not shown) attached to the communications line which securely encrypts information. Several companies manufacture a device which securely encrypts information, such as ised corporation, and therefore such device will not be described in further detail herein.

As noted above, the requesting portion of the overall transaction according to the present invention begins with a customer's request to electronically purchase prepaid telephone services from initiating terminal 110. The screen or menu will have the normal transaction options: withdrawal, balance inquiry, deposit, etc. However, with the present invention, a customer can now also purchase pre-paid telephone services by selecting the transaction option to purchase such services. The transaction to purchase prepaid telephone services may be offered in a selection menu as "Company Prepaid Telephone Card", as an example. The customer selects the appropriate option from the screen or menu by pressing a button or touching a screen, depending upon the initiating terminal 110, to interact with system 100 of the present invention. If the customer chooses the prepaid telephone services option, initiating terminal 110 preferably requests, via at least one screen or additional prompt, certain information from the customer, such as what denomination of prepaid telephone services are desired to be purchased, and then, the financial account from which such purchase is to be electronically debited. The customer is also informed of any convenience fee to be assessed, if any, to perform the desired transaction. Normally, the customer has already inserted a card to activate ATM 110. ATM 110 of the present invention preferably assumes that the card corresponds to the financial institution from which the customer will pay for the purchase. ATM 110 preferably inquires whether the customer wishes to have the funds taken from the customer's checking account, savings account, etc. The customer makes the desired selection. System 100 transmits the request to purchase prepaid telephone services, together with the financial account from which the customer desires to have funds electronically withdrawn to pay for such purchase, to central terminal 140.

It should be understood that initiating terminal 110 could instead have prompted the customer to designate the account to be debited the costs of the transaction before offering the customer a screen showing the dollar amounts from which to choose. For the sake of discussion, it will be assumed that the dollar amounts of prepaid telephone services are fixed, and are in the amounts of $10, $20 and $50. It will be appreciated that such amounts are for illustration purposes only, and in no way should be construed to limit the scope of the present invention.

Initiating terminal 110 then preferably builds a Point of Sale ("POS") transaction and passes the POS transaction to modular device handler 155. Device handler 155 builds a standard transaction message based on the contents of POS transaction received from initiating terminal 110 and sends the transaction message to router/switch 145. The standard transaction message fields are preferably filled as follows:

Type—"0200"

Transaction type—"44xx00"
    [indicating a purchase of goods or services from "xx", where "xx" is the account type.]

Point of Service ("POS") condition code—"14"
    [indicating a generic point of sale]

Merchant ID—"Company"
  [where "Company" is the actual name of the telephone service provider of the services for which the customer wishes to prepay]
Initiating Terminal Dispense Type—
  "7" $10 worth of prepaid telephone services dispensed
  "8" $20 worth of prepaid telephone services dispensed
  "9" $50 worth of prepaid telephone services dispensed
Merchant Type—"4812"
  [indicating that the telephone service/equipment is non-utility, non-regulated]
POS Data Code—"22140121010C"
  [Card data input capability "2"—magnetic stripe read
  Cardholder authentication "2"—PIN
  Card Retention capability "1"—can capture
  Operating environment "4"—off premises of terminal owner, unattended
  Cardholder present "0"—cardholder present
  Card present "1"—card present
  Card data input mode "2"—magnetic stripe read
  Cardholder authentication "0"—non-authenticated
  Cardholder authentication mode "1"—PIN
  Security data "0"—no security concern
  Pin capture capability "C"—12 characters]
Service Classification Code—"700"
  [indicating this transaction is a general purchase of services]

By employing the standard transaction message populated as described above, initiating terminal 110 preferably transmits the requested transaction information received from the customer by a high-speed dedicated line to central terminal 140.

Initiating terminal 110 determines that the subject transaction requires authorization and sends a request for authorization to central terminal 140, thereby entering the next stage of the requesting transaction. While various implementations will occur to those skilled in the art, central terminal 140 preferably includes switch 145, authorization unit 150, suspended journal files 170, and modular device handler 155 running on a Tandem-based platform for real-time processing, a SUN 2000 workstation for relational database 175 and MIS journal files 160, and an ESA9000 IBM mainframe for off-line (batch) processing, financial records maintenance, research, and reporting. Some of the many types of reports include: reconciliation of sold and unsold PINs, account of number of receipts 200 by denomination, summary of total PINs sold, etc. PINs 165 contains the different denominations of prepaid phone services that Company desires to sell ($10, $20 and $50 for purposes of the present discussion). The PIN numbers in PINs file 165 are preferably live and encrypted.

Switch 145 of central terminal 140 accepts the incoming request and activates authorization unit 150. Authorization unit 150 in turn forwards the request to an authorization agent (not shown). Central terminal 140 preferably has the appropriate linkages to debit card networks and credit card authorization points to authenticate the card and the account information belonging to the customer desiring to make the purchase. Among the information provided to the authorization agent is the request for authorization for the principal amount corresponding to the desired level of prepaid telephone services selected by the customer (referred herein as "the principal"), together with the appropriate convenience or service fee, if any.

The authorization agent receives the financial information from central terminal 140 and, assuming sufficient funds or credit exists in the referenced account, authorizes the transaction for the full amount of the principal and any convenience fee. It should be understood that the authorization agent may be a financial institution, a card issuer, an intercept processor, or a regional/national network. The system of the present invention permits customization to thereby allow the participating institutions to set their own approval limits for their customers.

As there are numerous known ways for obtaining authorization, any of which are compatible with the system and method of the present invention, the actual authorization method carried out by an authorization agent will not be considered in more detail herein. Moreover, it should be understood that the platform of central terminal 140 of the present invention may also be the authorization agent and perform authorization approval with the permission and within the guidelines established by a particular financial institution.

Once the authorization agent returns an approval message to central terminal 140, the requesting transaction has entered the authorization-approved stage. When central terminal 140 receives an approved transaction response, central terminal 140 writes an entry to journal files 170 and logs the transaction in relational databases 175 for long-term storage, retrieval, and reporting for subsequent research on that data. This entry should correctly represent the transaction, but is not included in any dollar-dispensed totals accrued to the ATM. If the customer selected $50 of prepaid services, and an approval is returned from the authorization agent, the transaction is preferably processed as a POS transaction for $50, i.e., for the dispense of one $50 prepaid telephone services receipt 200. The, ATS screen and balancing receipt is preferably modified to included counts of telephone receipts 300 dispensed, by denomination. However, it is preferred that no change be made to the standard Regulation E financial transaction receipt.

Return momentarily to FIG. 2 which illustrates an example receipt 200 for prepaid telephone services. The key components are the clear, live PIN, the Company number to call to access the services paid for (preferably toll-free), and any expiration date of the PIN. These elements are taken directly from the TENS, TWENTIES and FIFTIES files, except for the clear PIN. Device handler 155 decrypts the KPE using variant zero of the "known" KKE, then decrypts the PIN using variant zero of the clear KPE.

Receipt 200 is preferably printed prior to printing the financial transaction receipt. If the receipt printer faults before receipt 200 is completely printed, initiating terminal 110 preferably reverses the transaction. Initiating terminal 110 will then immediately report a receipt printer fault and the transaction menu item "Prepaid telephone services" will not be available. If a reversal occurs, regardless of reason, device handler 155 preferably returns the entire record—the encrypted PIN, encrypted KPE, toll-free #, batch number, expiration date and file key to central terminal 140 for insertion back into the appropriate TENS, TWENTIES or FIFTIES file in PINs database 165.

The second portion of the overall transaction, the dispensing transaction, will now be considered. When the transaction response is returned by authorization 150 to device handler 155 as approved, device handler 155 formats a request to central terminal 140 for the next available PIN in the appropriate TENS, TWENTIES or FIFTIES files. It should be observed at this point that if the transaction is returned by the authorization agent as not approved, device handler 155 delivers the denial to initiating terminal 110 for communication to the customer, without requesting a PIN from central terminal 140.

Central terminal 140 returns to device handler 155 a message containing the PIN, the associated KPE, a toll free number, batch number, and the file key. Central terminal 140 deletes the record from the TENS, TWENTIES, OR FIFTIES file of PINs 165 at this time. Device handler 155 transmits the PIN to initiating terminal 110, which in turn prints the PIN on issued receipt 200 for the customer. The PIN can be provided to the customer via a variety of methods, depending upon initiating terminal limitations, but preferably it is provided to the customer on receipt 200. Initiating terminal 110 preferably also issues a separate receipt (standard Regulation E) which itemizes the principal amount transferred to pay for the phone services purchased, and the convenience fee charged the customer's account for the transaction, if any, and from which account such funds were electronically debited. It should be understood that while two separate receipts may be issued by initiating terminal 110, according to another embodiment of the present invention, initiating terminal 110 issues only one receipt bearing on its face all of the information found on the two separate receipts of the preferred embodiment.

It should be understood by those skilled in the art that central terminal 140 of the present invention may be accessed, preferably via high-speed dedicated lines, from any number of networks 130 with their own initiating terminals and financial institutions with which they are associated. Because of this open design, an initiating terminal 110, such as an ATM, on a different network 130 than central terminal 140 may obtain authorization for and receive a live PIN to be provided to their customer.

Company is preferably connected to central terminal 140 by dial-up transmission line, but it will be understood that a dedicated line could be used instead. It should also be understood that more than one Company may be supported by the present system, in which case separate PINs 165 could be maintained for each Company supported.

As needed, new live PINs are provided by Company in a file called PINFILE to replenish PINs 165. PINFILE's record length is 80 bytes. Example file and record layouts for PINFILE are contained in Table A. The file is usually transmitted using an RJE SNA protocol dialup connection (remote 241) to central terminal 140. Each PIN number is preferably associated with a set amount of telephone service time corresponding to a given denomination shown in receipt 200. Thus, when Company's system encounters a PIN number, it knows that the encountered PIN number is a $20 PIN number, for example, and accordingly responds.

TABLE A

| Element | Description | Attribute | |
|---|---|---|---|
| PINFILE file header: | | | |
| Record type | "H" | 1 | A |
| File Replacement Code | "L" or "U" | 1 | A |
| File Name | "PINFILE" | 7 | A |
| Filler | blank | 65 | S |
| Record Number | "000001" | 6 | N |
| PINFILE detail record: | | | |
| Record type | "D" | 1 | A |
| PIN | hex character set, 0-F | 16 | AN |
| Filler | blank | 1 | S |
| KPE | hex character set, 0-F | 16 | AN |
| Filler | blank | 1 | S |
| Denomination | "10" or "20" or "50" | 2 | AN |

TABLE A-continued

| Element | Description | Attribute | |
|---|---|---|---|
| Filler | blank | 1 | S |
| Denomination | "10" or "20" or "50" | 2 | AN |
| Filler | blank | 1 | S |
| 800# | character set, 0-9 This is the 800 number the consumer calls - printed on receipt 200 | 7 | N |
| Filler | blank | 1 | S |
| Expiration date | MMDDYYYY | 8 | N |
| Filler | blank | 1 | S |
| Batch # | Comp. batch number, right justified, zero filled printed on receipt 200 | 9 | N |
| Filler | blank | 10 | S |
| Record number | sequential within file, right justified, zero filled | 6 | N |
| PINFILE trailer record: | | | |
| Record type | "T" | 1 | A |
| Total Number of $10 Records | count of $10 PINs detail of records | 6 | N |
| Total Number of $20 Records | count of $20 PINs detail records | 6 | N |
| Total Number of $50 Records | count of $50 PINs detail records | 6 | N |
| Total Dollars | total $ for all detail records | 6 | N |
| Total Record | recount count in file, including header and trailer records | 7 | N |
| Filler | blank | 42 | S |
| Records Number | sequential within file, right justified, 0 filled | 6 | N |

Explanation of Terms for Table A:

Batch #—The Company batch from which the particular PIN has been taken. This number will be printed on receipt 200.

Denomination—"10" or "20" or "50" (i.e., the dollar amount associated with the PIN).

File Replacement Code—"L" indicates a full file load and "U" indicates an update. A full file load should only be performed for the first file sent. All files subsequent to the first file should be updates.

Expiration Date—Preferably assigned by Company, sent in MMDDYYYY format. Will be printed on receipt 200.

File Name—Constant "PINFILE".

PIN—The encrypted PIN. This is a 16-character hex number resulting when the 10 character clear PIN is encrypted under a Key for PIN Encryption (KPE).

KPE—The encrypted Key for PIN Encryption. This is the key used for encrypting the PIN, encrypted under a Key for Key Encryption (KKE).

Record Number—A sequential number, incremented by 1, associated with the record in the file. The header record should always be "000001".

Record Type—Constant "H" for a header record, constant "D" for detail records, or constant "T" for a trailer record.

Total Dollars Represented—Total dollars represented by all detail records.

Total Number of $10 Records—Count of detail records containing $10 PINs.

Total Number of $20 Records—Count of detail records containing $20 PINs.

Total Number of $50 Records—Count of detail records containing $50 PINs.

Total Records—Count of all records in file, including header and trailer records.

800#—This is the last seven digits of the toll-free number a consumer will call to use the prepaid telephone services reflected by his receipt 200. This number, formatted "800-NNN-NNNN" will be printed on receipt 200.

Central terminal 140 builds three key-sequenced files for storage of the new PINs in PINs 165, one for each denomination of prepaid telephone services available for purchase: $10, $20, or $50. Each record preferably consists of the encrypted PIN, the key under which the PIN has been encrypted, the expiration date associated with the PIN, the Company batch number from which the PIN has been taken, and the last seven digits of the toll-free number associated with this PIN. The Key for PIN Encryption (KPE) is stored encrypted under a Key for Key Encryption (KEK). While the KEK is preferably generated by the Company, central terminal 140 can also be adapted to generate the KEK. The KEK value is input as a run-time parameter to device handler 155, which, as was mentioned earlier, is responsible for the decryption of each PIN as it is removed from PINs 165 and transmitted to the customer.

Figure 3:
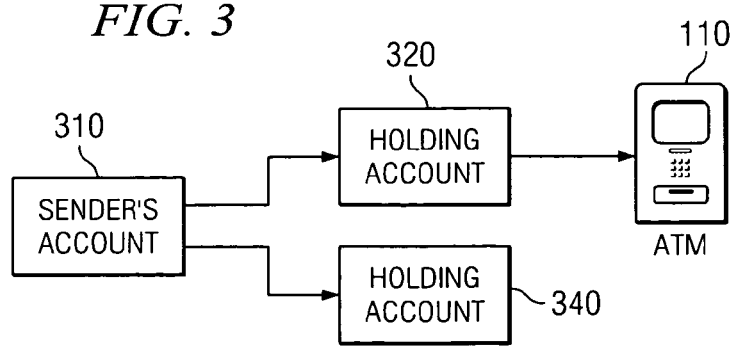
FIG. 3 is a schematic illustration of principal and fee transfer according to a preferred embodiment of the present invention.

Consider momentarily FIG. 3, which is a schematic block illustration of principal and fee (if any) transfer according to a preferred embodiment of the present invention. Upon receipt of the approval message, which amounts to approval of the authorization request and reflects the fact the customer does in fact have sufficient funds available, central terminal 140 "withdraws" the money from the customer's account 310 and credits holding account 320. Central terminal 140 also credits holding account 340 with a convenience fee, if any. The transaction is normally settled on a predetermined basis among the parties owning the pieces of the system responsible for carrying out the overall transaction. The distribution of the settlement is preferably a batch process.

As is the normal business practice within the electronic funds transfer (EFT) industry, once system 100 of the present invention has received an authorization approval message, the relevant financial institution has committed to reimburse the owner of initiating terminal 110 (an ATM in the present example) that will, in effect, be advancing funds on the customer's behalf when initiating terminal 110 dispenses receipt 200 for prepaid telephone services to the customer. Thus, the authorization approval is a guarantee on the part of the issuing institution that the acquiring institution will be reimbursed. For this reason, system 100 of the present invention can complete the overall transaction even in advance of actually getting the funds from the institution.

Figure 4:
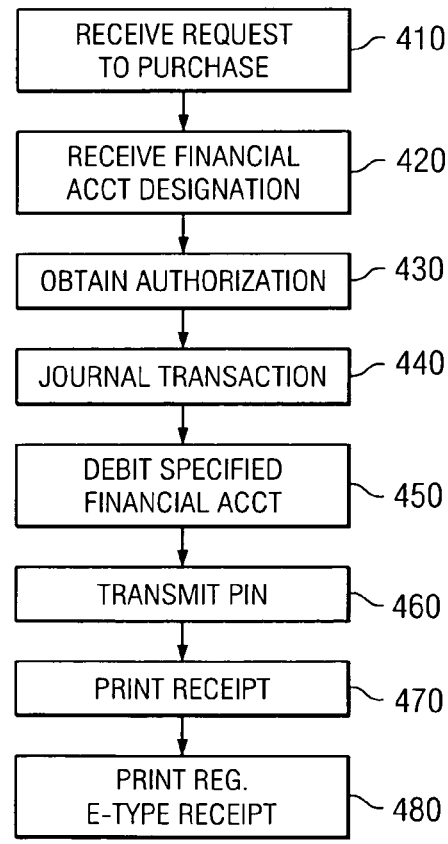
FIG. 4 is a flowchart illustrating an embodiment of the method of the present invention.

Consider lastly FIG. 4, which is a flowchart illustrating an embodiment of the method of the present invention. At Block 410 initiating terminal 110 receives a request to purchase a specified amount of prepaid telephone services (as described hereinabove) from a customer. Initiating terminal 110 requests and receives input from the customer designating a financial account from which central terminal 140 is to electronically debit the price of such purchase (block 420). Central terminal 140 requests authorization for such purchase from the authorizing agent responsible for the financial account designated by the customer at block 430. Assuming authorization is obtained, central terminal 140 then journals the transaction (block 440). Central terminal 140 may at this point electronically debit the specified financial account (block 450). Next, central terminal 140 obtains a PIN from PINs 165. This PIN is transmitted, at block 460, to initiating terminal 110, together with whatever calling instructions Company designates. It should be understood that the calling instructions to be printed on the receipt may be stored at initiating terminal 110 instead of being transmitted from central terminal 140. Initiating terminal 110 then prints a receipt (block 470), which is provided to the customer. This receipt contains the transmitted PIN and instructions, and is used instead of a telephone card to obtain telephone services up to the specified (purchased) amount. At block 480 a separate Regulation E-type receipt is preferably also printed.

It should be understood by those skilled in the art that the present description is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

We claim:

1. A system for purchase of prepaid telephone services, comprising:
   a central terminal operable to receive a request to purchase prepaid telephone services from an initiating terminal;
   wherein the central terminal is further operable to:
   receive an identifier of a financial account to be used to purchase the prepaid telephone services;
   seek authorization for the request;
   cause, using the central terminal, the electronic debiting of the financial account using the identifier; and
   log a transaction indicating a purchase of prepaid telephone services in response to receipt of an authorization; and
   transmit output data from the central terminal to the initiating terminal, wherein the output data is to be used instead of a telephone card to obtain telephone services.

2. The system of claim 1,
   wherein the central terminal received the request from the initiating terminal over a communication network.

3. The system of claim 1,
   wherein the central terminal is further operable to transmit receipt data to the initiating terminal which reflects the purchase of prepaid telephone services.

4. The system of claim 1,
   wherein the request further comprises a predetermined amount of prepaid telephone services selected from a plurality of amount options.

5. The system of claim 4,
   wherein the predetermined amount comprises a dollar amount.

6. The system of claim 1,
   wherein seeking authorization for the request further comprises seeking authorization for a financial amount dependent upon an amount of prepaid telephone services included with the request.

7. The system of claim 1,
   wherein the financial account comprises an account type selected from the group consisting of a credit card account and a debit card account.

8. The system of claim 1,
   wherein the central terminal is further operable to send rejection data to the initiating terminal if authorization for the request was not obtained.

9. A method for processing prepaid phone service transactions, comprising:
   receiving, at a central terminal, a request to purchase prepaid telephone services that was generated by an initiating terminal;

seeking financial authorization for the request using the central terminal;

logging a transaction using the central terminal indicating a purchase of prepaid telephone services in response to receipt of an authorization;

receiving an identifier of a financial account to be used to purchase the prepaid telephone services;

causing, using the central terminal, the electronic debiting of the financial account using the identifier; and transmitting output data from the central terminal to the initiating terminal, wherein the output data is to be used instead of a telephone card to obtain telephone services.

10. The method of claim 9, wherein the central terminal received the request from the initiating terminal over a communication network.

11. The method of claim 9, further comprising:

causing, using the central terminal, the electronic debiting of the financial account using the identifier.

12. The method of claim 9, further comprising:

transmitting receipt data from the central terminal to the initiating terminal which reflects the purchase of prepaid telephone services.

13. The method of claim 9, wherein the request further comprises a predetermined amount of prepaid telephone services selected from a plurality of amount options.

14. The method of claim 9, wherein the financial account comprises an account type selected from the group consisting of a credit card account and a debit card account.

15. The method of claim 9, further comprising:

sending rejection data from the central terminal to the initiating terminal if authorization for the request was not obtained.

16. The method of claim 9, further comprising:

receiving an identifier of a financial account to be used to purchase the prepaid telephone services; and causing, using the central terminal, the electronic debiting of the financial account using the identifier.

17. The method of claim 16, wherein the request further comprises a predetermined amount of prepaid telephone services selected from a plurality of amount options.

18. The method of claim 16, wherein the financial account comprises an account type selected from the group consisting of a credit card account and a debit card account.

19. A system for purchase of prepaid telephone services, comprising:

an initiating terminal operable to receive a request to purchase prepaid telephone services;

wherein the initiating terminal is further operable to:

transmit the request to a central terminal, the request comprising an identifier of a financial account to be used to purchase the prepaid telephone services;

receive output data from the central terminal if the request was financially authorized, wherein the output data reflects a purchase of prepaid telephone services, the output data to be used instead of a telephone card to obtain telephone services.

20. The system of claim 19, wherein the initiating terminal is operable to transmit the request over a communication network.

21. The system of claim 19, wherein the request further comprises a predetermined amount of prepaid telephone services selected from a plurality of amount options.

22. The system of claim 19, wherein the financial account comprises an account type selected from the group consisting of a credit card account and a debit card account.

23. The system of claim 19, wherein the initiating terminal further comprises a graphical user interface operable to receive the request.

24. A method for processing prepaid phone service transactions, comprising:

receiving at an initiating terminal, a request to purchase prepaid telephone services, the request comprising an identifier of a financial account to be used to purchase the prepaid telephone services;

transmitting the request to a central terminal;

receiving output data from the central terminal if the request was financially authorized, wherein the output data reflects a purchase of prepaid telephone services, the output data to be used instead of a telephone card to obtain telephone services.

25. The method of claim 24, wherein transmitting the request further comprises:

transmitting the request over a communication network.

26. The method of claim 24, wherein the request further comprises a predetermined amount of prepaid telephone services selected from a plurality of amount options.

27. The method of claim 24, wherein the financial account comprises an account type selected from the group consisting of a credit card account and a debit card account.

28. The method of claim 24, further comprising:

receiving the request with a graphical user interface.

* * * * *